US006307624B1

(12) United States Patent
Brück et al.

(10) Patent No.: US 6,307,624 B1
(45) Date of Patent: Oct. 23, 2001

(54) PROCESS FOR THE PREPARATION OF PARTIALLY HYDROGENATED ACRYLONITRILE-BUTADIENE RUBBERS (HNBR) WITH ON-LINE APPLICATION OF RAMAN SPECTROSCOPY

(75) Inventors: Dieter Brück, Köln; Udo Wolf, Kempen, both of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/133,261

(22) Filed: Aug. 13, 1998

(30) Foreign Application Priority Data

Aug. 21, 1997 (DE) .............................................. 197 36 310

(51) Int. Cl.$^7$ .............................. C08C 19/02; C08F 8/04; G01N 21/65
(52) U.S. Cl. ...................... 356/301; 525/329.3; 525/338; 525/339
(58) Field of Search .................. 356/301; 525/329.3, 525/338, 339

(56) References Cited

U.S. PATENT DOCUMENTS

| 3,646,142 | 2/1972 | Stobel ................................... 260/669 |
| 3,984,601 | 10/1976 | Blickenstaff ........................... 428/364 |
| 4,238,442 | 12/1980 | Cline et al. ............................. 264/206 |
| 4,791,172 | 12/1988 | Hohn et al. ............................. 525/234 |
| 5,302,667 | 4/1994 | Rhodes et al. ......................... 525/314 |
| 5,638,172 | * 6/1997 | Alsmeyer et al. .................... 356/301 |
| 5,652,653 | * 7/1997 | Alsmeyer et al. .................... 356/301 |
| 6,115,528 | * 9/2000 | Schmucker et al. ................. 356/301 |

FOREIGN PATENT DOCUMENTS

| 13 054 | 7/1980 | (EP) . |
| 265 706 | 5/1988 | (EP) . |
| 2 322 878 | 4/1977 | (FR) . |
| 1 558 491 | 1/1980 | (GB) . |

OTHER PUBLICATIONS

Willard et al. "Instrumental Methods of Analysis", 5th ed., D. Van Nostrand Co., New York, pp. 189–193 (1974).*
*Ullman's Encyclopedia of Industrial Chemistry*, vol. A23, pp. 322–324 (1993).
European Search Report for foreign counterpart application No. EP 98 115052 (Dec. 21, 1998).
Yu S. Kovshov, V. V. Moiseev, T.P. Zhasrkikh, and I.P. Zornikov, Hydrogenated Butadiene–Acrylonitrile Rubbers (Production, Properities and Application), in *International Polymer Science and Technology*, pp. T/6–T/11, Bd. 18, No. 2 (1991).
Derwent Abstract of EP 13 054 (Jul. 9, 1980).
Derwent Abstract for EP 265 706 (May 4, 1988).
Derwent Abstract for FR 232 2878 (Apr. 1, 1977).

* cited by examiner

*Primary Examiner*—Donald R. Wilson
(74) *Attorney, Agent, or Firm*—Connolly Bove Lodge & Hutz LLP

(57) ABSTRACT

The present invention relates to a process for the preparation of partially hydrogenated acrylonitrile-butadiene rubber in a pressurised reactor by hydrogenation of acrylonitrile-butadiene rubber by means of homogeneous or heterogeneous catalysis, in which the reactor contents are rendered inert before commencement of the hydrogenation, the Raman spectra of the reactor contents are recorded at short time intervals and the actual degree of hydrogenation of the product is determined from the intensities of the Raman emission lines and, on attainment of the required degree of hydrogenation, the reaction is arrested by suitable means.

17 Claims, No Drawings

PROCESS FOR THE PREPARATION OF PARTIALLY HYDROGENATED ACRYLONITRILE-BUTADIENE RUBBERS (HNBR) WITH ON-LINE APPLICATION OF RAMAN SPECTROSCOPY

BACKGROUND OF THE INVENTION

1. Field of the Invention

The present invention relates to a process for the preparation of partially hydrogenated acrylonitrile-butadiene rubber (HNBR) in a pressurised reactor by hydrogenation of acrylonitrile-butadiene rubber (NBR) by means of homogeneous or heterogeneous catalysis with the application of Raman spectroscopy.

2. Description of the Prior Art

The partial hydrogenation of the C—C— double bonds in acrylonitrile-butadiene rubbers (NBR) results in a special rubber, the hydrogenated nitrile rubber (HNBR).

In the hydrogenation processes carried out industrially at present, the NBR solutions are hydrogenated with hydrogen in an agitated pressurised autoclave in batches in the presence of a homogeneous or heterogeneous catalyst. The concentration of polymer in the solution to be hydrogenated is about 15 wt. %. In "Ullmann's Encyclopedia of Industrial Chemistry" dated 1993 [1], the homogeneous and heterogeneous catalysts used for the hydrogenation and the reaction conditions for the hydrogenation are described.

In the homogeneous hydrogenation both the catalyst and the substrate used for the hydrogenation are in solution. Chlorinated aromatic hydrocarbons such as, for example, chlorobenzene, are used as solvent. Rhodium-phosphine complexes or ruthenium-phosphine complexes are preferably used as catalysts. Depending upon the catalyst chosen and its concentration, the reaction temperatures are within the range of 100 to 150° C. The reaction pressure, which is determined substantially by the hydrogen partial pressure, can vary from a few up to about 190 bar.

In the heterogeneous hydrogenation of NBR, palladium catalysts on, for example, carbon, calcium carbonate or silicon dioxide are preferably used, and the catalysts are dispersed in the dissolved substrate. The reaction is generally carried out in ketones as solvent at a temperature of about 50° C. and at a pressure of about 50 bar.

Whereas sulfur or sulfur donors can be used for the vulcanisation of partially hydrogenated HNBR, the use of peroxide or high-energy beams is necessary for curing in the case of the completely hydrogenated product. Because of their good elongation at break and tear strength, commercially the partially hydrogenated HNBR types are preferred to the completely hydrogenated products.

A considerable problem, in particular in the production of the partially hydrogenated HNBR products, is the exact and reproducible establishment of the required degree of hydrogenation. It is known that the C—C— double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for the hydrogenation are distinguished by a predominant proportion of the 1,4-trans configured double bonds.

The progress of the hydrogenation can be found by determination of the hydrogen absorption or, more precisely, by infrared spectroscopic (IR) analysis of samples withdrawn from the reactor. An appropriate method of IR analysis is described in ASTM D 5670-95. The disadvantage of this procedure is that as a rule about 20 to 30 minutes elapse before the analytical results are available. During this period the reaction can already have continued over and beyond the desired end point. As the hydrogenation procedure requires expensive, pressure-resistant reactors, the economic efficiency of the entire process is also substantially dependent on the space-time yield. The economic efficiency of the hydrogenation process can be decidedly improved by increasing the product throughput while at the same time ensuring product quality according to specification.

NIR (near-infrared) spectroscopy is frequently used for the purpose of process control. As suitable optical fibres for NIR technology are available, the relevant NIR spectrometer can even be set up at a relatively great distance from the reactor. However, the disadvantage of NMR technology is that the fundamental vibrations of the IR spectrum are not measured, but rather the overtone and combination vibrations which are as a rule superimposed. Provided that the hydrogenation always proceeds under the identical conditions (temperature, polymer concentration, pressure), the degree of hydrogenation can be determined by means of chemometric methods. As technical processes always vary within a certain bandwidth, a reliable determination of the required reaction variables is not feasible.

The object was accordingly to find a new process which renders possible the establishment of a required degree of hydrogenation of HNBR with at the same time an improved spacetime yield.

SUMMARY OF THE INVENTION

This invention accordingly provides a process for the preparation of partially hydrogenated acrylonitrile-butadiene rubber in a pressurised reactor by hydrogenation of acrylonitrile-butadiene rubber by means of homogeneous or heterogeneous catalysis, which is characterised in that the reactor contents are rendered inert before commencement of the hydrogenation, the Raman spectra of the reactor contents are recorded at short time intervals and the actual degree of hydrogenation of the product is determined from the intensities of the Raman emission lines and, on attainment of the required degree of hydrogenation, the reaction is arrested by suitable means.

DESCRIPTION OF THE PREFERRED EMBODIMENTS

The Raman effect of polymers is described in the literature (see, for example, P. J. Hendra, C. H. Jones and G. Warnes: Fourier Transform Raman Spectroscopy, Techniques and Chemical Applications, Ellis Horwood, Chichester (UK) (1991)). The emitted Raman signal, which is excited by an intensive light source, is measured. As a rule laser light of defined wavelength $\lambda_0$ is used in order to excite the Raman effect. The lasers conventionally used are neodymium-yttrium-aluminium-garnet (Nd:YAG) lasers, which emit at a wavelength of 1.06 $\mu$m, helium-neon ($\lambda$=633 nm) lasers, argon ion ($\lambda$=488, 515 nm) lasers or semiconductor lasers (various wavelengths). The use of the Nd:YAG laser has the advantage over the helium-neon laser that, owing to the longer exciting wavelength, interfering fluorescence of organic materials is produced less strongly.

As a rule the "Stokes lines ($\lambda_i > \lambda_0$)" of the Raman spectrum are used for the analysis ($\lambda_i$: wavelength of the Raman signal). Particularly at a more elevated temperature, the "anti-Stokes lines ($\lambda_i < \lambda_0$)" can also be of significance for analysing the Raman spectra.

The Raman spectra can be measured by means of dispersive spectrometers available on the market and described by C. Henry in Analytical Chemistry News & Features, May (1997) 309A or by means of Fourier Transform (FT)-Raman spectrometers, which produce the Raman spectrum with an interferometer. In the case of dispersive spectrometers CCD detectors can be used, while InGaAs detectors or germanium detectors cooled with liquid nitrogen are suitable for FT-Raman equipment. In the process according to the invention it is preferable to use FT-Raman spectrometers with excitation of the Raman radiation by an Nd:YAG laser, because the excitation of interfering fluorescence is thereby largely avoided.

Suitable devices according to the invention for carrying out the Raman spectroscopy in a pressurised reactor are inspection glasses, preferably an inspection glass directly on the reactor, which renders possible the introduction of the exciting radiation into the reactor and the exit of the Raman radiation out of the reactor. Industrial safety requirements can be complied with particularly easily with the use of inspection glasses, as these can be purchased as standard structural components for the visual control of the contents of pressurised reactors.

Materials suitable for use as inspection glasses are, for example, borosilicate glasses, quartz or sapphire, which show no absorption or fluorescence in the range of the exciting, wavelength $\lambda_0$ including the relevant wavelength range ($\lambda_0 \pm \lambda_r$) of the Raman scattering and, in the case of glass complying with DIN 7080, 7081, 8902 and 8903, have been produced in such a way that they bear an official registration for use in the selected pressure range according to the German Pressure Vessel Order (AD-N4). Such glasses are described, for example, on page 11 of the brochure of the "Technische Glaswerke Ilmenau GmbH", D 98684 Ilmenau.

The inspection glass can be mounted in the wall of the relevant reactor or at the end of a pressure-resistant metal tube which passes through the wall, the base or through the cover of the reactor and dips into the reaction solution.

To excite the Raman signal, the laser light is passed through the inspection glass into the reactor. The Raman scattered radiation leaves the reactor again through the same inspection glass and, by means of a suitable lens system, can be focused onto the detector of a Raman spectrometer.

If the Raman spectrometer is to be mounted at a site further removed from the reactor, suitable optical fibres are used for transporting the exciting light and for leading away the Raman signal. Because of the low self-absorption, quartz optical fibres can be used in the case where the Raman radiation is excited by means of Nd:YAG lasers. At the end of the optical fibre provided for the laser radiation it is possible to mount a suitable optical device (probe), which focuses the exciting light through the inspection glass into the solution, collects the Raman signal from a given solid angle, if necessary filters out the Rayleigh scattering and connects up with another optical fibre. Such optics can be purchased (for example, from firms such as Dilor and Bruker).

The focal length of the probe is so designed, or the probe is so placed, that the focal point in the reaction solution is 0 to 5 cm, preferably 0 to 1 cm, behind the inspection glass. For inspection glasses of 1.5 to 3 cm in thickness the resulting focal lengths are thus, for example, from 2 to 3.5 cm. Fix-focus or vario-objectives with large beam width can be used. To avoid heat conduction, the probe is preferably mounted at some distance in front of the inspection glass (for example, 2 to 5 mm, depending upon the selected focal length of the objective of the probe).

In recognition of the safety regulations of the trade association of the chemical industry VBG 93 "Laserstrahlung", in the device according to the invention the probe is shielded outwardly so that an uncontrolled release of laser radiation is impossible. This is effected preferably by guiding the objective of the probe flush with and through the opening of a diaphragm which is mounted at some distance in front of the inspection glass. The probe is in this case shifted in the direction of the inspection glass until an optimal Raman signal of the reactor contents is measured.

Another variant of the procedure according to the invention consists in measuring the Raman effect by means of a probe which is connected to the optical fibre and dips into the reaction solution. Probes connected to optical fibres and through which the exciting light is passed directly into the reaction solution and which collect the Raman signal are known in principle. Owing to the high safety requirements with regard to pressure resistance and temperature resistance, these optical fibre-probes are at the moment usable only to a limited extent for monitoring hydrogenation reactions under pressure.

The use of laser radiation as an exciting light source for the Raman radiation, in the process described, must presuppose that the reactor contents are rendered inert, as the laser radiation beamed into the reactor under focusing conditions attains a high energy density and is therefore a potential ignition source. This means that oxygen has to be completely removed from the reactor before commencement of hydrogenation. To this end the entire reaction solution is flushed with nitrogen several times before the laser radiation is switched on and before hydrogen is admitted into the reactor. Preferably the reactor contents are constantly inspected for the presence of oxygen.

On attainment of the required degree of hydrogenation, the laser is switched off and the reaction is halted by releasing the hydrogen pressure.

The Raman spectra accumulated within a given time interval in order to improve the signal-to-noise ratio (for example, 200 scans with a spectral resolution of 4 cm$^{-1}$) are then analysed in the spectral range of 4000–50 cm$^{-1}$ relative shift of the Raman signal compared with the exciting laser radiation in the Stokes and anti-Stokes range, preferably in the Stokes range 2500–1500 cm$^{-1}$.

The Raman spectra of NBR show the following characteristic signals for C—C— double bonds of the butadiene units: $I_0(1667)$ for 1,4-trans-C=C at about 1667 cm$^{-1}$, $I_0(1654)$ for 1,4-cis-C=C at about 1654 cm$^{-1}$ and $I_0(1641)$ for 1,2-vinyl-C=C at about 1641 cm$^{-1}$. The CN-groups (nitrile group) produces a Raman signal $I_0(2237)$ at about 2237 cm$^-$.

As the 1,4-trans configured butadiene units are hydrogenated comparatively slowly, with progressive hydrogenation the remaining double bond content of the product is determined substantially only through the 1,4-trans configured double bonds. As the nitrile group is unchanged during the hydrogenation, it can be used, for example, as an internal standard. Therefore the residual double bond content $RD_t$ (%) at time t, after hydrogenation of the 1,4-cis- and 1,2-vinyl-C=C structures, is approximately proportional to the quotient $Q_t = I_t(1667)/I_t(2237)$, with $I_t(1667)$ and $I_t(2237)$ denoting the intensities of the Raman spectrum at 1667 cm$^{-1}$ and 2237 cm$^{-1}$ of the partially hydrogenated product.

If now the content of 1,4-trans-C—C— double bonds [DB(1,4-trans)] of the NBR product used for the hydrogenation is determined by means of classical laboratory methods before the hydrogenation, then using $I_0$ and $I_t$, the respective Raman intensities at the commencement and at time t of the hydrogenation, the actual [concentration RD(1,4-trans)]$_t$ can be determined as:

$$[RD(1,4\text{-trans})]_t = [I_t(1667)/I_t(2237)]/[I_0(1667)/I_0(2237)]*[DB(1,4\text{-trans})] \quad (1)$$

Similarly, the concentrations [RD(1,4-cis)]$_t$ and [RD(1,2-vinyl)]$_t$ can also be determined if required.

Preferably the required degree of hydrogenation of the partially hydrogenated HNBR is therefore determined in accordance with the above details and equation (1) in such a way that the intensity ratios $Q_0=I_0(1667)/I_0(2237)$ and $Q_t=I_t(1667)/I_t(2237)$ of the Raman emission lines of the 1,4-trans-C—C— double bonds at 1667 cm$^{-1}$ to the ACN groups in NBR at 2237 cm$^{-1}$ before (t=0) and at the time t of the hydrogenation are determined, and the actual degree of hydrogenation [RD(1,4-trans)]$_t$ is calculated by multiplication of $Q_t/Q_0$ by the percentage content of the 1,4-trans-C—C— double bonds in the starting product.

Although the use of Raman spectroscopy for the polymerisation of, for example, vinyl acetate, styrene and vinylimidazole, styrene, as well as methyl methacrylate was known from reports by T. Özpozan, B. Schrader, St. Keller, Spectrochimica Acta Part A 53 (1997) 1 to 7, E.P.C. Lai, H. S. Ghaziakar, Applied Spectroscopy 48 (1994) 1011 as well as J. Haigh, A. Brookes, P. J. Hendra, A. Strawen, C. Nicolas, M. Purprik, Spectrochimica Acta Part A 53 (1997) 9/19 and E. Gulari, K. McKeigue, K. Y. Sng,, Macromolecules 1984, 17, 1822 to 1825, it was nevertheless surprising that Raman spectroscopy could be used in the catalytic hydrogenation of NBR to HNBR, because this reaction is carried out under pressure and at elevated temperatures. It is known, namely, that the intensity of the Raman scattering is very weak and is destroyed by fluorescence, in particular in the case of technical products (polymers, catalysts). Furthermore at more elevated temperatures, especially in large reactors, the proportion of heat radiation is greater, which may lead to an interference in the measurement. That the weak Raman scattering can be observed through a thick inspection glass, for example at 135° C., in the presence of an organo-metallic catalyst, was therefore—as explained—unexpected. In this connection reference may also be made to the above report by Özpozan, which describes the polymerisation of vinyl acetate with the use of Raman spectroscopy, and especially to page 2 of the report where, in the experimental section, it is pointed out that the conventional method of preparation of polyvinyl acetate was modified in order to obtain better conditions for the Raman spectroscopy.

EXAMPLES

Example 1

A solution of 225 g NBR (comprising approx. 40% acrylonitrile component and approx. 60% butadiene component, the latter containing 85.5% 1,4-trans, 7.3% is 1,4-cis and 7.2% is 1,2-vinyl butadiene units), 2.25 g triphenylphosphine, 0.675 g rhodium catalyst and 1275 g chlorobenzene is placed under nitrogen in a 2 liter autoclave provided with a multistage impulse counter-current agitator and an inspection glass having a thickness of 1.5 cm and a clear width of 3.9 cm. The solution is then flushed three times with nitrogen at a rate of rotation of 280 min$^{-1}$ and each time the pressure is released to normal value.

A plastics disc provided with a bore is attached to the outer flange of the inspection glass. The objective of a probe (firm Bruker, Karlsruhe) having a focal length of 2 cm, which is connected via two optical fibres of 15 m in length to the FT-Raman spectrometer (RFS 100, with 1W Nd:YAG laser, firm Bruker, Karlsruhe), is moved through the bore of the plastics disc in the direction of the inspection glass until a maximal Raman signal is measured. The distance of the objective from the inspection glass was 4 mm at this point. Nitrogen is used to cool the probe and to render inert the space between the inspection glass and the plastics disc, so that a temperature of below 80° C. can be maintained consistently.

The reaction solution is then heated to the reaction temperature of 135° C. Subsequently the ratio of the Raman intensities $I_0(1667)$ and $I_0(2237)$ is determined by recording a Raman spectrum (200 scans with 4 cm$^{-1}$ spectral resolution). The Raman intensities $I_t(i)$ are determined by the base-line method. The following base-lines are used: for $I_t(1667)$ base-line between 1686 and 1647 cm$^{-1}$; for $I_t(2237)$ base-line between 2263 and 2212 cm$^{-1}$. For the ratio of the Raman intensities $I_0(1667)/I_0(2237)$ of the starting material at 135° C., the following value is thereby established: (0.0274/0.0341)=0.8035.

Hydrogen is then applied under pressure to a total pressure of 35 bar. At the same time a spectrum-measuring and evaluation programmed is started, which allows the on-line monitoring of the hydrogenation through determination of the ratio of the Raman intensities $I_t(1667)$ and $I_0(2237)$ at time t and a display of the momentary residual double bond content (RD)$_t$ according to equation (1) on the screen of the attached computer. With a recording in each case of 200 scans at 4 cm$^{-1}$ resolution there was a time requirement of 6.5 minutes per spectrum. After a hydrogenation time of t=6.5 hours, the ratio of the Raman intensities $I_t(1667)/I_t(2237)$ was 0.18. Hence a residual double bond content of $$[RD(1,4\text{-trans})]_{6.5h}=[0.18/0.8035]*85.5\%=19.2\%$$

is calculated using equation (1).

At this value the reaction was arrested by releasing the pressure to normal value.

What is claimed is:

1. A process for the preparation of partially hydrogenated acrylonitrile-butadiene rubber (HNBR) in a pressurized reactor by hydrogenation of acrylonitrile-butadiene rubber (NBR) by means of homogeneous or heterogeneous catalysis using a Raman spectrometer to measure Raman spectra of the reactor contents, the process comprising the steps of: a) charging the reactor with reactants; b) hydrogenating the NBR in the presence of the catalyst; c) recording the Raman spectra of the reactor contents at short time intervals using a pressure-resistant inspection glass attached to the reactor to carry out a Raman effect, the Raman effect carried out by passing au exciting light through the inspection glass into the reaction solution and observing the Raman scattering; d) determining a degree of hydrogenation from the intensities of the Ramnan emission lines; and e) arresting the reaction upon attainment of a required degree of hydrogenation; wherein the reactor contents are rendered inert before commencement of the hydrogenation by removing oxygen from the reactor.

2. The process according to claim 1, wherein the inspection glass is situated in a pressure-resistant tube which dips into the reaction solution through openings in the reactor.

3. The process according to claim 1, wherein an optical device is connected to the Raman spectrometer via optical fibers and is mounted in front of the inspection glass, the optical device having a focal length such that the exciting light is focused into the reaction solution in a range of from 0 to 5 cm behind the inspection glass and the Raman scattering is collected.

4. The process according to claim 3, wherein the Raman spectrum is formed by a laser light and the optical device is passed through an opening of a diaphragm mounted in front of the inspection glass to prevent the uncontrolled release of the laser light.

5. The process according to claim 1, wherein the Raman spectrum is formed by radiation which is excited with the aid of a Nd:YAG laser and the Raman spectrometer is a Fourier Transform (FT) Raman spectrometer.

6. The process according to claim 1, wherein the inspection glass is borosilicate glass, quartz, or sapphire.

7. The process according to claim 3, wherein the exciting light is focused into the reaction solution in the range of from 0 to 1 cm behind the inspection glass.

8. The process according to claim 3, wherein the optical device is a probe.

9. The process according to claim 1, wherein the oxygen is removed by flushing the reactor with nitrogen.

10. The process according to claim 1, wherein the reaction is carried out at an elevated temperature.

11. The process according to claim 1, wherein the homogeneous catalyst is a rhodium-phosphine or ruthenium-phosphine complex.

12. The process according to claim 1, wherein the heterogeneous catalyst is a palladium catalyst.

13. The process according to claim 1, wherein the degree of hydrogenation is determined from the residual 1,4-trans-C—C— double bond content $[RD(1,4\text{-trans})]_t$ of the HNBR product, and wherein the residual 1,4-trans-C—C— double bond content $[RD(1,4\text{-trans})]_t$ of the HNBR product is calculated from Raman intensity ratios using equation (1):

$$[RD(1,4\text{-trans})]_t = Q_t/Q_0 * [DB(1,4\text{-trans})] \quad (1)$$

where the Raman intensity ratios $Q_0 = I_0(1667)/I_0(2237)$ and $Q_2 = I_t(1667)/I_t(2237)$ are determined from the Raman emission lines of the 1,4-trans-C—C— double bonds at 1667 $cm^{-1}$ and the Raman emission lines of the ACN groups in NBR at 2237 $cm^{-1}$ before (t=0) and at the time of the hydrogenation (t), and where [DB(1,4-trans)] is the percentage content of the 1,4-trans-C—C— double bonds in the NBR material before the commencement of the hydrogenation.

14. The process according to claim 1, wherein the intensities of the Raman spectra at 1667, 1654, and 1641 $cm^{-1}$ are used for determining the degree of hydrogenation of the HNBR product.

15. The process according to claim 1, wherein the reaction is arrested by a release of pressure upon attainment of the required degree of hydrogenation.

16. A process for preparing a partially hydrogenated acrylonitrile-butadiene rubber (HNBR), the process comprising the steps of:

a) charging a reactor with reactants, b) rendering the reactor contents inert before commencing hydrogenation by removing oxygen from the reactor, c) pressurizing the reactor, d) hydrogenating acrylonitrile-butadiene rubber (NBR) in the presence of a homogeneous or heterogeneous catalyst, e) recording Raman spectra of the reactants at short time intervals using a pressure-resistant inspection glass to the reactor to carry out a Raman effect, the Raman effect carried out by passing an exciting light through the inspection glass into the reactor contents and observing the Raman scattering, f) determining a degree of hydrogenation of the HNBR product from intensities of the Raman emission lines, and g) arresting the hydrogenation reaction after a required degree of hydrogenation is achieved.

17. The process according to claim 16, wherein the oxygen is removed by flushing the reactor with nitrogen.

* * * * *